United States Patent
Katayama et al.

(10) Patent No.: US 11,546,868 B2
(45) Date of Patent: Jan. 3, 2023

(54) WIRELESS COMMUNICATION METHOD, CONTROL DEVICE, TERMINAL AND WIRELESS COMMUNICATION SYSTEM

(71) Applicant: NIPPON TELEGRAPH AND TELEPHONE CORPORATION, Tokyo (JP)

(72) Inventors: Yohei Katayama, Musashino (JP); Atsushi Taniguchi, Musashino (JP); Kenji Shimizu, Musashino (JP); Takahiro Yamazaki, Musashino (JP); Maiko Naya, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 77 days.

(21) Appl. No.: 17/047,714

(22) PCT Filed: Apr. 8, 2019

(86) PCT No.: PCT/JP2019/015273
§ 371 (c)(1),
(2) Date: Oct. 15, 2020

(87) PCT Pub. No.: WO2019/203038
PCT Pub. Date: Oct. 24, 2019

(65) Prior Publication Data
US 2021/0274456 A1   Sep. 2, 2021

(30) Foreign Application Priority Data
Apr. 16, 2018   (JP) .............................. JP2018-078722

(51) Int. Cl.
*H04W 56/00*   (2009.01)
*H04W 72/12*   (2009.01)

(52) U.S. Cl.
CPC ... *H04W 56/0015* (2013.01); *H04W 72/1263* (2013.01)

(58) Field of Classification Search
CPC . H04W 52/02; H04W 56/00; H04W 56/0015; H04W 72/1263; Y02D 30/70
See application file for complete search history.

(56) References Cited

U.S. PATENT DOCUMENTS

| | | | |
|---|---|---|---|
| 8,179,854 B2 * | 5/2012 | Claussen | H04W 16/18 370/328 |
| 2008/0025341 A1 * | 1/2008 | Rao | H04W 72/048 370/468 |
| 2013/0336307 A1 * | 12/2013 | Park | H04W 56/002 370/350 |

FOREIGN PATENT DOCUMENTS

| | | | |
|---|---|---|---|
| JP | 2010166517 A | * | 7/2010 |
| JP | 5600093 B2 | | 10/2014 |

* cited by examiner

*Primary Examiner* — Saad A. Waqas

(57) ABSTRACT

A radio communication method executed by a control apparatus controlling a base station apparatus performing communication with a terminal in a predetermined region, and includes determining whether there is the terminal that is asynchronized in communication with the base station apparatus transmitting a synchronization signal, and controlling, in a case where it is determined that there is the asynchronized terminal, the base station apparatus to increase an allocation time of the synchronization signal in compliance with a radio scheme used by the asynchronized terminal or to shorten an allocation cycle of the synchronization signal.

3 Claims, 8 Drawing Sheets

| PARAMETER | VALUE |
|---|---|
| STATE | BASE STATION RETRIEVAL |
| RETRIEVAL TIME PERIOD | 2:10~2:11 |
| ... | ... |
Fig. 3
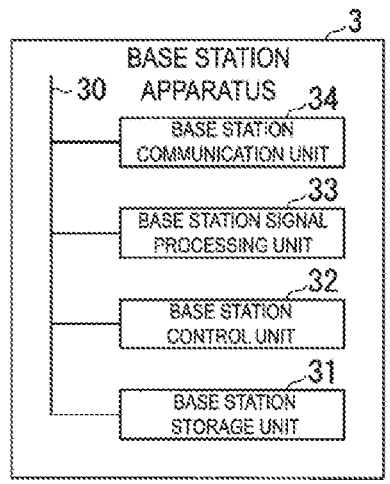
Fig. 4
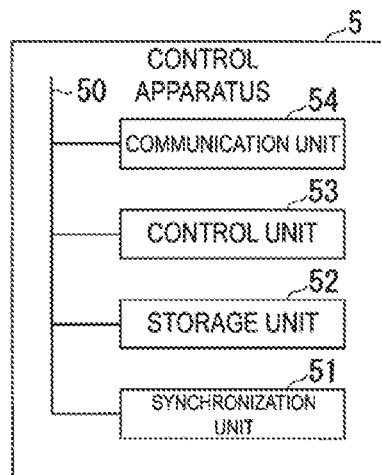
Fig. 5

| RADIO SCHEME INFORMATION | TERMINAL INFORMATION | REGISTERED POSITION INFORMATION | STATE INFORMATION |
|---|---|---|---|
| FIRST RADIO SCHEME | TERMINAL 2-1 | REGION 7-1: BASE STATION APPARATUS 3-2 | IN SYNCHRONIZATION |
| | TERMINAL 2-2 | REGION 7-1: BASE STATION APPARATUS 3-1 | TERMINAL RETRIEVAL (NUMBER OF RETRIES: 0, ELAPSED TIME: 0 HOURS) |
| | TERMINAL 2-3 | REGION 7-1: BASE STATION APPARATUS 3-3 | TERMINAL RETRIEVAL FAILURE |
| ... | ... | ... | ... |

Fig. 6

| PARAMETER | | VALUE |
|---|---|---|
| FIRST RADIO SCHEME | ALLOCATION TIME OF RADIO SIGNAL IN NON-RETRIEVAL MODE | 10 SECONDS |
| | ALLOCATION CYCLE OF RADIO SIGNAL IN NON-RETRIEVAL MODE | 24 HOURS |
| | TRANSMISSION CYCLE OF SYNCHRONIZATION SIGNAL IN NON-RETRIEVAL MODE | 24 HOURS |
| | TRANSMISSION CYCLE OF SYNCHRONIZATION SIGNAL IN RETRIEVAL MODE | 30 SECONDS |
| | ALLOCATION TIME OF SYNCHRONIZATION SIGNAL IN RETRIEVAL MODE | 1 SECOND |
| | RETRIEVAL TIME PERIOD | 2:00 TO 3:00 |
| | ... | ... |
| ... | | ... |

Fig. 7

| RADIO SCHEME INFORMATION | REGION INFORMATION | BASE STATION APPARATUS INFORMATION | OPERATION MODE | ALLOCATION TIME | ALLOCATION CYCLE (INVERSE NUMBER OF FREQUENCY) |
|---|---|---|---|---|---|
| FIRST RADIO SCHEME | REGION 7-1 | BASE STATION APPARATUS 3-1 | RETRIEVAL | 1 SECOND | 30 SECONDS |
| | | BASE STATION APPARATUS 3-2 | NON-RETRIEVAL | 10 SECONDS | 24 HOURS |
| | | BASE STATION APPARATUS 3-3 | NON-RETRIEVAL | 10 SECONDS | 24 HOURS |
| | | ⋮ | ⋮ | ⋮ | ⋮ |
| | REGION 7-2 | ⋮ | NON-RETRIEVAL | 10 SECONDS | 24 HOURS |
| | ⋮ | ⋮ | ⋮ | ⋮ | ⋮ |
| ⋮ | | | | | |

Fig. 8

WIRELESS COMMUNICATION METHOD, CONTROL DEVICE, TERMINAL AND WIRELESS COMMUNICATION SYSTEM

CROSS-REFERENCE TO RELATED APPLICATIONS

This application is a 371 U.S. National Phase of International Application No. PCT/JP2019/015273, filed on Apr. 8, 2019, which claims priority to Japanese Application No. 2018-078722 filed on Apr. 16, 2018. The entire disclosures of the above applications are incorporated herein by reference.

TECHNICAL FIELD

The present disclosure relates to a radio communication method, a control apparatus, a terminal, and a radio communication system.

BACKGROUND ART

There is a radio communication system including a radio signal processing apparatus that is an apparatus executing radio signal processing, a base station apparatus such as an access point, a slave station, or a remote radio unit (RRU), and a terminal such as an Internet of Things (IoT) device having various requirements. Each terminal performs communication with a base station apparatus according to a radio scheme appropriate for requirements of the terminal. The radio scheme is, for example, LoRa, SigFox, or NB-IoT.

A battery capacity of an IoT device may be smaller than a battery capacity of a terminal other than the IoT device. A communication of the IoT device may be less frequent than a communication of a terminal other than the IoT device. Thus, in a case where a terminal such as an IoT device performs communication with a base station apparatus, a facility utilization factor of the base station apparatus may be reduced. In a case where a facility utilization factor of the base station apparatus is reduced, installation cost, an installation area, and operation cost of the base station apparatus increase.

At least one of a radio signal processing apparatus or a base station apparatus may execute radio signal processing using software (refer to Patent Literature 1). The base station apparatus determines whether software in compliance with a radio scheme of a terminal has been downloaded to the base station apparatus. In a case where the software has been downloaded to the base station apparatus, the base station apparatus executes the radio signal processing. In a case where the software has not been downloaded to the base station apparatus, the radio signal processing apparatus executes the radio signal processing instead of the base station apparatus.

As mentioned above, the base station apparatus autonomously selects an apparatus executing the radio signal processing of the radio signal processing apparatus and the base station apparatus depending on requested latency. The selected base station apparatus and radio signal processing apparatus can switch software enabling a radio communication system to flexibly change a radio scheme. The radio communication system executes short-time communication by using a radio scheme used for an IoT device with a small communication amount, executes communication by using another radio communication during the remaining time, and can thus improve a facility utilization factor of the base station apparatus.

CITATION LIST

Patent Literature

Patent Literature 1: JP 5600093 B

SUMMARY OF THE INVENTION

Technical Problem

The base station apparatus may transmit and receive a control signal for connection starting or synchronization to and from a terminal.

However, a terminal such as an IoT device has a small battery capacity, and thus cannot wait for the control signal to be received from the base station apparatus for a long period of time. The base station apparatus is required to improve a facility utilization factor of the base station apparatus, and thus cannot wait for the control signal to be received from the terminal for a long period of time.

In a case where the base station apparatus sets a time allocated for communication of a control signal according to a radio scheme of the terminal to be short, the time required for the terminal to start connection or to be in synchronization is increased, and thus power consumption of the terminal is increased. In contrast, in a case where the base station apparatus sets a time allocated for communication of a control signal according to the radio scheme of the terminal to be long, a facility utilization factor of the base station apparatus is reduced. Although the base station apparatus and the terminal are synchronized in communication with each other, in a case where a set station is changed or an IoT device is transferred, the base station apparatus and the terminal are required to be resynchronized in communication with each other.

As mentioned above, the radio communication system of the related art cannot suppress power consumption of the terminal in a case where the facility utilization factor of the base station apparatus is improved.

In light of the circumstances, an object of the present disclosure is to provide a radio communication method, a control apparatus, a terminal, and a radio communication system capable of suppressing power consumption of a terminal while improving a facility utilization factor of a base station apparatus.

Means for Solving the Problem

According to an aspect of the present disclosure, there is provided a radio communication method executed by a control apparatus controlling a base station apparatus performing communication with a terminal in a predetermined region, the radio communication method including determining whether there is the terminal that is asynchronized in communication with the base station apparatus transmitting a synchronization signal; and controlling, in a case where it is determined that there is the asynchronized terminal, the base station apparatus to increase an allocation time of the synchronization signal in compliance with a radio scheme used by the asynchronized terminal or to shorten an allocation cycle of the synchronization signal.

In the radio communication method according to the aspect, during the control of the base station apparatus, whether a current time is included in a predetermined time period is determined, and the base station apparatus is controlled in a case where the current time is included in the predetermined time period.

In the radio communication method according to the aspect, during the control of the base station apparatus, the allocation time of the synchronization signal is increased, or the allocation cycle of the synchronization signal is shortened, according to increases in the number of retries of terminal retrieval for determining whether there is the asynchronized terminal and an elapsed time from determination of asynchronization.

In the radio communication method according to the aspect, during the control of the base station apparatus, the number of base station apparatuses retrieving a position of the asynchronized terminal is changed.

According to another aspect of the present disclosure, there is provided a radio communication method executed by a terminal performing communication with a base station apparatus in a predetermined region, the radio communication method including determining whether the base station apparatus transmitting a synchronization signal and the terminal are synchronized in communication with each other; and determining whether a current time is included in a predetermined time period in a case where the base station apparatus and the terminal are determined as not being synchronized in communication with each other, and waiting for the synchronization signal to be received in a case where the current time is included in the predetermined time period.

According to yet another aspect of the present disclosure, there is provided a control apparatus including a synchronization unit configured to determine whether there is a terminal that is asynchronized in communication with a base station apparatus transmitting a synchronization signal, in a predetermined region; and a control unit configured to control, in a case where it is determined that there is the asynchronized terminal, the base station apparatus to increase an allocation time of the synchronization signal in compliance with a radio scheme used by the asynchronized terminal or to shorten an allocation cycle of the synchronization signal.

In the control apparatus according to the aspect, the control unit determines whether a current time is included in a predetermined time period, and controls the base station apparatus in a case where the current time is included in the predetermined time period.

In the control apparatus according to the aspect, the control unit increases the allocation time of the synchronization signal or shortens the allocation cycle of the synchronization signal according to increases in the number of retries of terminal retrieval for determining whether there is the asynchronized terminal and an elapsed time from determination of asynchronization.

In the control apparatus according to the aspect, the control unit changes the number of base station apparatuses retrieving a position of the asynchronized terminal.

According to yet another aspect of the present disclosure, there is provided a terminal including a terminal synchronization unit configured to determine whether a base station apparatus transmitting a synchronization signal and the terminal are synchronized in communication with each other; and a terminal control unit configured to determine whether a current time is included in a predetermined time period in a case where it is determined that the base station apparatus and the terminal are not synchronized in communication with each other, and to wait for the synchronization signal to be received in a case where the current time is included in the predetermined time period.

According to yet another aspect of the present disclosure, there is provided a radio communication system including a terminal; and a control apparatus, in which the terminal includes a terminal synchronization unit configured to determine whether a base station apparatus transmitting a synchronization signal and the terminal are synchronized in communication with each other, and a terminal control unit configured to determine whether a current time is included in a predetermined time period in a case where the base station apparatus and the terminal are determined as not being synchronized in communication with each other, and to wait for the synchronization signal to be received in a case where the current time is included in the predetermined time period, and in which the control apparatus includes a synchronization unit configured to determine whether there is the terminal that is asynchronized in communication with the base station apparatus transmitting a synchronization signal, in a predetermined region, and a control unit configured to control, in a case where it is determined that there is the asynchronized terminal, the base station apparatus to increase an allocation time of the synchronization signal in compliance with a radio scheme used by the asynchronized terminal or to shorten an allocation cycle of the synchronization signal.

In the radio communication system according to the aspect, the control unit determines whether a current time is included in a predetermined time period, and controls the base station apparatus in a case where the current time is included in the predetermined time period.

In the radio communication system according to the aspect, the control unit increases the allocation time of the synchronization signal or shortens the allocation cycle of the synchronization signal according to increases in the number of retries of terminal retrieval for determining whether there is the asynchronized terminal and an elapsed time from determination of asynchronization.

In the radio communication system according to the aspect, the control unit changes the number of base station apparatuses retrieving a position of the asynchronized terminal.

Effects of the Invention

According to the present disclosure, it is possible to suppress power consumption of a terminal while improving a facility utilization factor of a base station apparatus.

BRIEF DESCRIPTION OF DRAWINGS

FIG. 3 is a diagram illustrating an example of a parameter table of the terminal.

FIG. 4 is a diagram illustrating an example of a configuration of a base station apparatus.

FIG. 5 is a diagram illustrating an example of a configuration of a control apparatus.

FIG. 6 is a diagram illustrating an example of a terminal state table.

FIG. 7 is a diagram illustrating an example of a parameter table of the control apparatus.

FIG. 8 is a diagram illustrating an example of a radio scheme management table.

DESCRIPTION OF EMBODIMENTS

Hereinafter, an embodiment of the present disclosure will be described with reference to the drawings.

Figure 1:
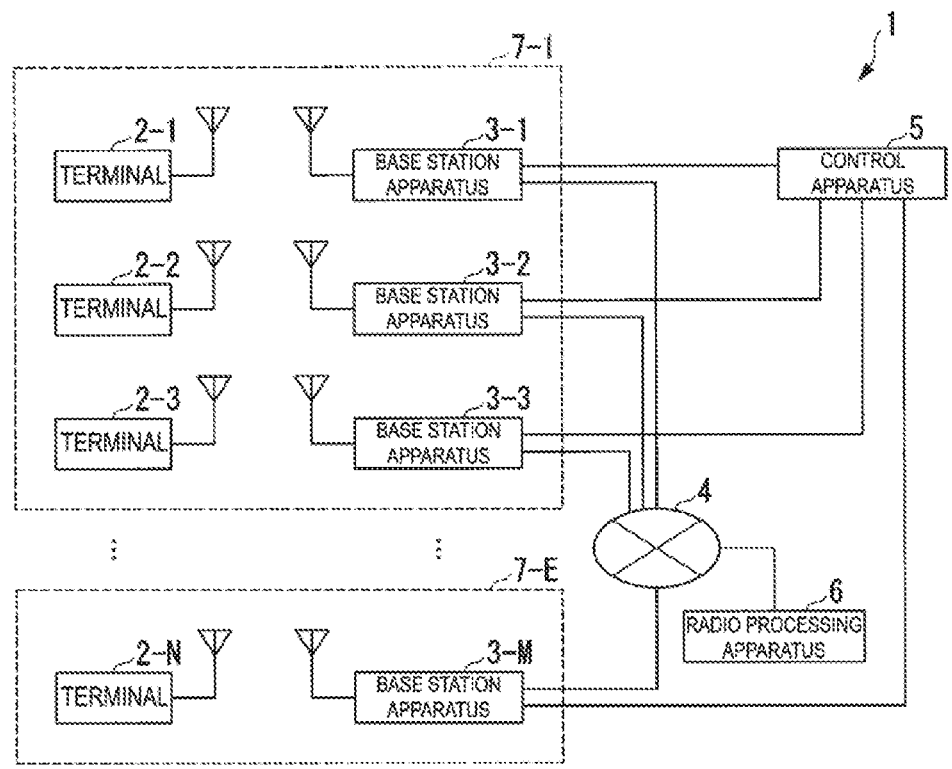
FIG. 1 is a diagram illustrating an example of a configuration of a radio communication system.

FIG. 1 is a diagram illustrating an example of a configuration of a radio communication system 1. The radio communication system 1 is a system executing communication in compliance with a plurality of radio schemes. The radio communication system 1 includes terminals 2-1 to 2-N (where N is an integer of 1 or greater), base station apparatuses 3-1 to 3-M (where M is an integer of 1 or greater), a communication line 4, a control apparatus 5, and a radio processing apparatus 6.

The radio communication system 1 includes regions 7-1 to 7-E (where E is an integer of 1 or greater) that are predetermined regions. In FIG. 1, in an example, the base station apparatuses 3-1 to 3-3 are located in the region 7-1. In an example, the terminals 2-1 to 2-3 are located in the region 7-1. In an example, the base station apparatus 3-M is located in the region 7-E. In an example, the terminal 2-N is located in the region 7-E.

The terminal 2 executes radio communication with the base station apparatus 3 according to at least one type of radio scheme among a plurality of radio schemes in compliance with the base station apparatus 3. The terminal 2 is not required to execute radio communication with the base station apparatus 3 at all times, and may execute the radio communication, for example, periodically. The terminal 2 is, for example, a smart phone terminal, a tablet terminal, or an IoT device.

The base station apparatus 3 is an apparatus executing communication in compliance with a plurality of radio schemes. The base station apparatus performs communication with the terminal 2 in compliance with each radio scheme by switching between a plurality of radio schemes such as 802.11 standards. The radio schemes may be, for example, LoRa, SigFox, and NB-IoT. The base station apparatus 3 is an access point in compliance with, for example, software defined radio (SDR). A radio scheme in compliance with the base station apparatus 3 is, for example, a radio scheme required by a plurality of service providers providing radio communication services. The communication line 4 transmits data signals (packet) between the base station apparatus 3 and the radio processing apparatus 6.

The control apparatus 5 is an information processing apparatus such as a server. The control apparatus 5 controls an operation of each base station apparatus 3. For example, the control apparatus 5 controls an operation mode of the base station apparatus 3, and thus causes the base station apparatus 3 to retrieve a position of the terminal 2 that is out of synchronization in communication with the base station apparatus 3.

The control apparatus 5 acquires a retrieval result from the base station apparatus 3.

The radio processing apparatus 6 determines whether software in compliance with a radio scheme used by the terminal 2 has been downloaded to the base station apparatus 3. In a case where the software in compliance with the radio scheme used by the terminal 2 has not been downloaded to the base station apparatus 3, the radio processing apparatus 6 may execute radio signal processing in compliance with the radio scheme used by the terminal 2 instead of the base station apparatus 3. The radio processing apparatus 6 transmits a result of the radio signal processing to the base station apparatus 3.

Figure 2:
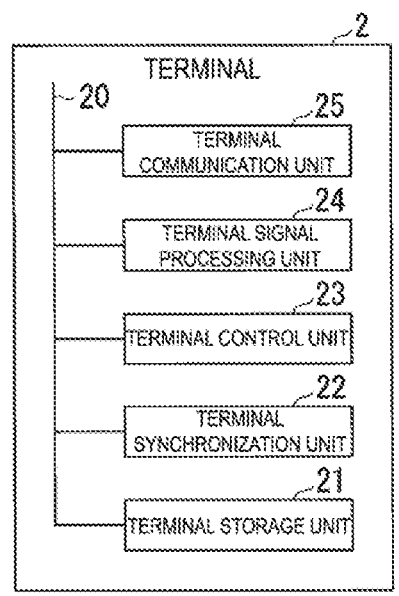
FIG. 2 is a diagram illustrating an example of a configuration of a terminal.

Next, a description will be made on an example of a configuration of the terminal 2. FIG. 2 is a diagram illustrating an example of a configuration of the terminal 2. The terminal 2 includes a terminal storage unit 21, a terminal synchronization unit 22, a terminal control unit 23, a terminal signal processing unit 24, and a terminal communication unit 25. The terminal synchronization unit 22, the terminal control unit 23, the terminal signal processing unit 24, and the terminal communication unit 25 are implemented by a processor such as a central processing unit (CPU) executing a program stored in the terminal storage unit 21. Some or all of the functional units may be implemented by using hardware such as large scale integration (LSI) or an application specific integrated circuit (ASIC). A bus 20 transmits data in the terminal 2.

The terminal storage unit 21 is a nonvolatile storage device (non-transitory recording medium) such as a flash memory. The terminal storage unit 21 may further include a volatile recording medium such as a random access memory (RAM). The terminal storage unit 21 stores information (schedule information) regarding a schedule such as an allocation time and an allocation cycle (an inverse number of an allocation frequency) of a radio signal used by the terminal. The terminal storage unit 21 stores a program executed by each functional unit of the terminal and a parameter table of the terminal 2.

FIG. 3 is a diagram illustrating an example of a parameter table of the terminal 2. The parameter table of the terminal 2 is a table in which parameters for controlling an operation of the terminal 2 are registered. In the parameter table of the terminal 2, a parameter and a value are associated with each other. In a case where synchronization in communication occurs, a parameter "state" is correlated with "in synchronization". In a case where synchronization in communication does not occur, the parameter "state" is correlated with "base station retrieval". The base station retrieval indicates that the terminal 2 waits for a synchronization signal transmitted from the base station apparatus 3 to be received, that is, the base station apparatus 3 retrieves a position of the terminal 2. A parameter "retrieval time period" is correlated with a predetermined time period in which the terminal 2 retrieves the base station apparatus 3. The retrieval time period is defined in advance according to terminals other than the terminal 2.

The terminal synchronization unit 22 determines whether the base station apparatus 3 transmitting a synchronization signal and the terminal are synchronized in communication with each other. For example, the terminal synchronization unit 22 determines whether the base station apparatus 3 and the terminal are synchronized in communication with each other on the basis of whether a control signal such as a synchronization signal has been received from the base station apparatus 3.

In a case where synchronization in communication is determined as not occurring, the terminal control unit 23 acquires the retrieval time period registered in the parameter table of the terminal 2. The terminal control unit 23 determines whether the current time is included in the retrieval time period, and waits for a synchronization signal to be received in a case where the current time is included in the retrieval time period.

The terminal signal processing unit 24 executes signal processing in compliance with a radio scheme used by the terminal 2. The radio scheme is, for example, LoRa, SigFox, or NB-IoT. Hereinafter, a radio scheme used by the terminal 2 located in the region 7-1 will be referred to as a "first radio scheme". A frequency of communication based on the first radio scheme may be lower than a frequency of communication based on other radio schemes.

The terminal communication unit 25 executes radio communication with the base station apparatus 3. The terminal communication unit 25 executes a modulation processing in compliance with the first radio scheme on a baseband signal generated by the terminal signal processing unit 24.

The terminal communication unit 25 receives a control signal such as a synchronization signal in compliance with the first radio scheme from the base station apparatus 3. The control signal such as a synchronization signal may be transmitted from the base station apparatus 3 toward a specific section in the region 7, and may be transmitted from the base station apparatus 3 toward a specific terminal 2 in the region 7. The control signal includes information regarding a schedule such as an allocation time and an allocation cycle of a radio signal in compliance with the first radio scheme. The control signal may further include information indicating approval of connection. The terminal communication unit 25 executes a demodulation processing in compliance with the first radio scheme on the control signal such as a synchronization signal received from the base station apparatus 3.

The terminal communication unit 25 may receive a beacon signal including a synchronization signal in compliance with the first radio scheme from the base station apparatus 3. The beacon signal is transmitted from the base station apparatus 3 toward a specific section in the region 7. The beacon signal includes information regarding a schedule such as an allocation time and an allocation cycle of a radio signal in compliance with the first radio scheme. The terminal communication unit 25 executes a demodulation processing in compliance with the first radio scheme on the beacon signal received from the base station apparatus 3.

Next, a description will be made on an example of a configuration of the base station apparatus 3.

FIG. 4 is a diagram illustrating an example of a configuration of the base station apparatus 3. The base station apparatus 3 includes a bus 30, a base station storage unit 31, a base station control unit 32, a base station signal processing unit 33, and a base station communication unit 34. The base station control unit 32, the base station signal processing unit 33, and the base station communication unit 34 are implemented by a processor such as a CPU executing a program stored in the terminal storage unit 21. Some or all of the functional units may be implemented by using hardware such as LSI or an ASIC. The bus 30 transmits data in the base station apparatus 3.

The base station storage unit 31 is a nonvolatile storage device (non-transitory recording medium) such as a flash memory. The base station storage unit 31 may further include a volatile recording medium such as a RAM. The base station storage unit 31 stores information regarding a schedule such as an allocation time and an allocation cycle of a radio signal. The base station storage unit 31 stores a program executed by each functional unit of the base station apparatus 3. The program is a software program executing, for example, signal processing in compliance with the first radio scheme.

In a case where an operation mode set by the control apparatus 5 is "non-retrieval", the base station control unit 32 executes predetermined typical communication instead of executing processing of retrieving a position of the terminal 2. For example, the base station control unit 32 executes communication with the terminal 2 on the basis of schedule information by using a data signal.

In a case where an operation mode set by the control apparatus 5 is "retrieval", the base station control unit 32 executes the processing of executing a position of the terminal 2. For example, the base station control unit 32 waits for a response from the terminal 2 by using a control signal, or a synchronization signal included in a beacon signal. The base station control unit 32 determines the presence or absence of a response from the terminal 2 in a predetermined cycle. In a case where a response cannot receive a response from the terminal 2 within a predetermined time, the base station control unit 32 determines that there is the terminal 2 that is out of synchronization in communication (the terminal 2 that is not synchronized in communication). The base station control unit 32 transmits a terminal retrieval result to the control apparatus 5 via the base station communication unit 34.

The base station signal processing unit 33 executes signal processing in compliance with a plurality radio schemes according to a program stored in the base station storage unit 31. For example, the base station signal processing unit 33 executes signal processing in compliance with the first radio scheme used by the terminal 2.

The base station communication unit 34 transmits a control signal such as a synchronization signal in compliance with the first radio scheme to the terminal 2. The base station communication unit 34 may transmit a beacon signal in compliance with the first radio scheme to the terminal 2. The base station communication unit 34 executes a demodulation processing in compliance with the first radio scheme on a control signal (response) received from the terminal 2. The base station communication unit 34 transmits a data signal in compliance with the first radio scheme to the terminal 2. The base station communication unit 34 executes a modulation processing in compliance with the first radio scheme on a data signal received from the terminal 2.

Next, a description will be made on an example of a configuration of the control apparatus 5.

FIG. 5 is a diagram illustrating an example of a configuration of the control apparatus 5. The control apparatus 5 includes a bus 50, a synchronization unit 51, a storage unit 52, a control unit 53, and a communication unit 54. The synchronization unit 51, the control unit 53, and the communication unit 54 are implemented by a processor such as a CPU executing a program stored in the storage unit 52. Some or all of the functional units may be implemented by using hardware such as LSI or an ASIC. The bus 50 transmits data in the control apparatus 5.

The synchronization unit 51 determines whether there is the terminal 2 that is out of synchronization in communication with the base station apparatus 3 (the terminal 2 that is not synchronized in communication). The synchronization unit 51 executes communication with the terminal 2 in a predetermined cycle, and determines the presence or absence of a response from the terminal 2 in a predetermined cycle. In a case where a response cannot receive a response from the terminal 2 within a predetermined time, the synchronization unit 51 determines that there is the terminal 2 that is out of synchronization in communication.

The storage unit 52 is a nonvolatile storage device (non-transitory recording medium) such as a flash memory. The storage unit 52 may further include a volatile recording medium such as a RAM. The storage unit 52 stores a terminal state table, a parameter table of the control apparatus 5, and a radio scheme management table.

FIG. 6 is a diagram illustrating an example of the terminal state table. The terminal state table is a table including information indicating a state of synchronization of the terminal 2. In the terminal state table, radio scheme information, terminal information, registered position information, and state information are correlated with each other. The radio scheme information is identification information of a radio scheme. The terminal is identification information of the terminal 2. The registered position information is information indicating a position of the terminal 2 in the region 7. For example, in a case where the terminal 2 is located in a specific range in which communication can be performed with the base station apparatus 3-2 in the region 7-1, "region 7-1: base station apparatus 3-2" is represented.

In the terminal state table, the state information indicates whether the terminal 2 and the base station apparatus 3 are out of synchronization in communication with each other. In a case where the terminal 2 and the base station apparatus 3 are not out of synchronization in communication with each other, the state information is represented as "in synchronization". In a case where the terminal 2 and the base station apparatus 3 are in a state of being out of synchronization in communication, and the base station apparatus 3 retrieves a position of the terminal 2, the state information is represented as "terminal retrieval". The state information "terminal retrieval" is correlated with the number of retries and an elapsed time from out-of-synchronization. In a case where the terminal 2 and the base station apparatus 3 are in a state of being out of synchronization in communication, and the base station apparatus 3 fails to retrieve a position of the terminal 2 a predetermined number or more, the state information is represented as "terminal retrieval failure".

FIG. 7 is a diagram illustrating an example of the parameter table of the control apparatus 5. The parameter table of the control apparatus 5 is a table in which parameters for the control apparatus 5 controlling an operation of the base station apparatus 3 are registered. In the parameter table of the control apparatus 5, an allocation time of a radio signal in a non-retrieval mode, an allocation cycle of a radio signal in the non-retrieval mode, a transmission cycle of a synchronization signal in the non-retrieval mode, a transmission cycle of a synchronization signal in a retrieval mode, an allocation time of a synchronization signal in the retrieval mode, and a retrieval time period are correlated with each other.

FIG. 8 is a diagram illustrating an example of the radio scheme management table. The radio scheme management table is a table for the base station apparatus 3 controlling parameters in compliance with each radio scheme. In the radio scheme management table, radio scheme information, region information, base station apparatus information, an operation mode, an allocation time, and an allocation cycle are correlated with each other.

The radio scheme information is identification information of a radio scheme. The region information is identification information of the region 7. The base station apparatus information is identification information of the base station apparatus 3. The operation mode is an operation mode "retrieval" or "non-retrieval" of the base station apparatus 3. The allocation time is a time allocated to a radio signal in compliance with a radio scheme used by the terminal 2. The allocation cycle is a cycle (an inverse number of a frequency) in which transmission and reception timings are allocated to a radio signal in compliance with a radio scheme used by the terminal 2.

In a case where it is determined that there is the asynchronized terminal 2, the control unit 53 controls the base station apparatus 3 to increase an allocation time of a synchronization signal in compliance with the first radio scheme used by the asynchronized terminal 2. In a case where it is determined that there is the asynchronized terminal 2, the control unit 53 controls the base station apparatus 3 to shorten an allocation cycle of a synchronization signal.

The control unit 53 determines whether the current time is included in the retrieval time period registered in the parameter table of the control apparatus 5. In a case where the current time is included in the retrieval time period, the control unit 53 controls a retrieval processing performed by the base station apparatus 3. The control unit 53 increases an allocation time of a synchronization signal in the base station apparatus 3 according to increases in the number of retrieval retries for determining whether there is the asynchronized terminal 2, and an elapsed time from determination of asynchronization.

The control unit 53 shortens an allocation cycle of a synchronization signal in the base station apparatus 3 according to increases in the number of retrieval retries and an elapsed time. In other words, the control unit 53 increases a transmission of the synchronization signal in the base station apparatus 3 more frequent according to increases in the number of retrieval retries and an elapsed time. The control unit 53 may change the number of base station apparatuses 3 that retrieve a position of the terminal 2 according to increases in the number of retrieval retries and an elapsed time.

The communication unit 54 transmits parameters for controlling an operation of the base station apparatus 3 to the base station apparatus 3. The communication unit 54 receives a result of retrieving the terminal 2 from the base station apparatus 3 having executed retrieval. Next, a description will be made on an example of a configuration of the radio processing apparatus 6.

Figure 9:
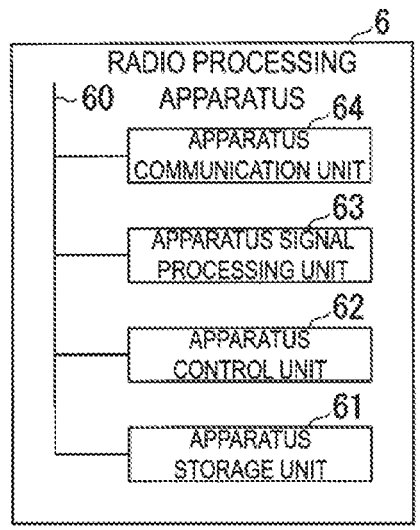
FIG. 9 is a diagram illustrating an example of a configuration of a radio processing apparatus.

FIG. 9 is a diagram illustrating an example of a configuration of the radio processing apparatus 6. The radio processing apparatus 6 includes a bus 60, an apparatus storage unit 61, an apparatus control unit 62, an apparatus signal processing unit 63, and an apparatus communication unit 64. The apparatus control unit 62, the apparatus signal processing unit 63, and the apparatus communication unit 64 are implemented by a processor such as a CPU executing a program stored in the apparatus storage unit 61. Some or all of the functional units may be implemented by using hardware such as LSI or an ASIC. The bus 60 transmits data in the radio processing apparatus 6.

The apparatus storage unit 61 is a nonvolatile storage device (non-transitory recording medium) such as a flash memory. The apparatus storage unit 61 may further include a volatile recording medium such as a RAM. The apparatus storage unit 61 stores a program executed by each functional unit of the radio processing apparatus 6. The apparatus storage unit 61 further stores a software program executing signal processing in compliance with a plurality of radio schemes such as the first radio scheme. The apparatus storage unit 61 may store identification information of a software program downloaded to the base station apparatus 3 for each base station apparatus 3.

The apparatus control unit 62 determines whether software in compliance with the first radio scheme used by the terminal 2 has been downloaded to the base station apparatus 3. In a case where the software in compliance with the first radio scheme used by the terminal 2 has not been downloaded to the base station apparatus 3, the apparatus control unit 62 may execute radio signal processing in compliance with the first radio scheme used by the terminal 2 instead of the base station apparatus 3. The apparatus control unit 62 transmits a result of the radio signal processing to the base station apparatus 3 via the apparatus communication unit 64.

In a case where a program for signal processing in compliance with the first radio scheme used by the terminal 2 has not been downloaded to the base station apparatus 3, the apparatus signal processing unit 63 executes signal processing according to the first radio scheme under the control of the apparatus control unit 62 according to the program stored in the apparatus storage unit 61.

The apparatus communication unit 64 executes communication with the base station apparatus 3. The apparatus communication unit 64 transmits a result of signal processing in compliance with the first radio scheme to the base station apparatus 3. The apparatus communication unit 64 may transmit a program for signal processing in compliance with the first radio scheme used by the terminal 2 to the base station apparatus 3. Consequently, the apparatus communication unit 64 can install the program for signal processing in compliance with the first radio scheme in the base station apparatus 3.

Next, a description will be made on an example of an operation of the radio communication system 1.

Figure 10:
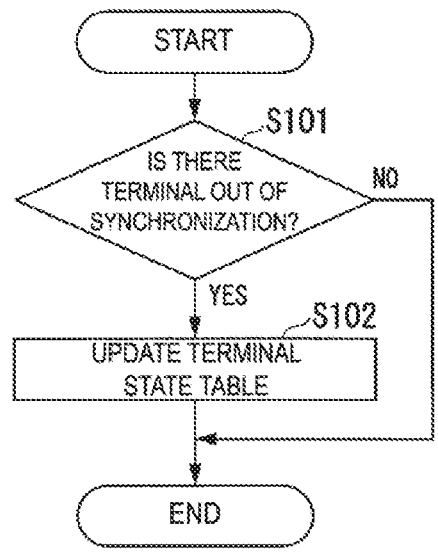
FIG. 10 is a flowchart illustrating an example of an operation in which the control apparatus checks a state of synchronization of the terminal.

FIG. 10 is a flowchart illustrating an example of an operation in which the control apparatus 5 checks a state of synchronization of the terminal 2. The synchronization unit 51 executes communication with the terminal 2 in a predetermined cycle, and determines the presence or absence of a response from the terminal 2 in a predetermined cycle. In a case where a response cannot be received from the terminal 2 within a predetermined time, the synchronization unit 51 determines that there is the terminal 2 that is out of synchronization in communication (the terminal 2 that is not synchronized in communication) (step S101).

In a case where it is determined that there is the terminal 2 that is out of synchronization in communication (step S101: YES), the control unit 53 changes the state information of the terminal 2 out of synchronization in the terminal state table to "terminal retrieval (number of retries: 0, elapsed time: 0 hours)" (step S102). In a case where it is determined that there is no terminal 2 out of synchronization (step S101: NO), the control unit 53 finishes the processing in which the control apparatus 5 checks a state of synchronization of the terminal 2.

Figure 11:
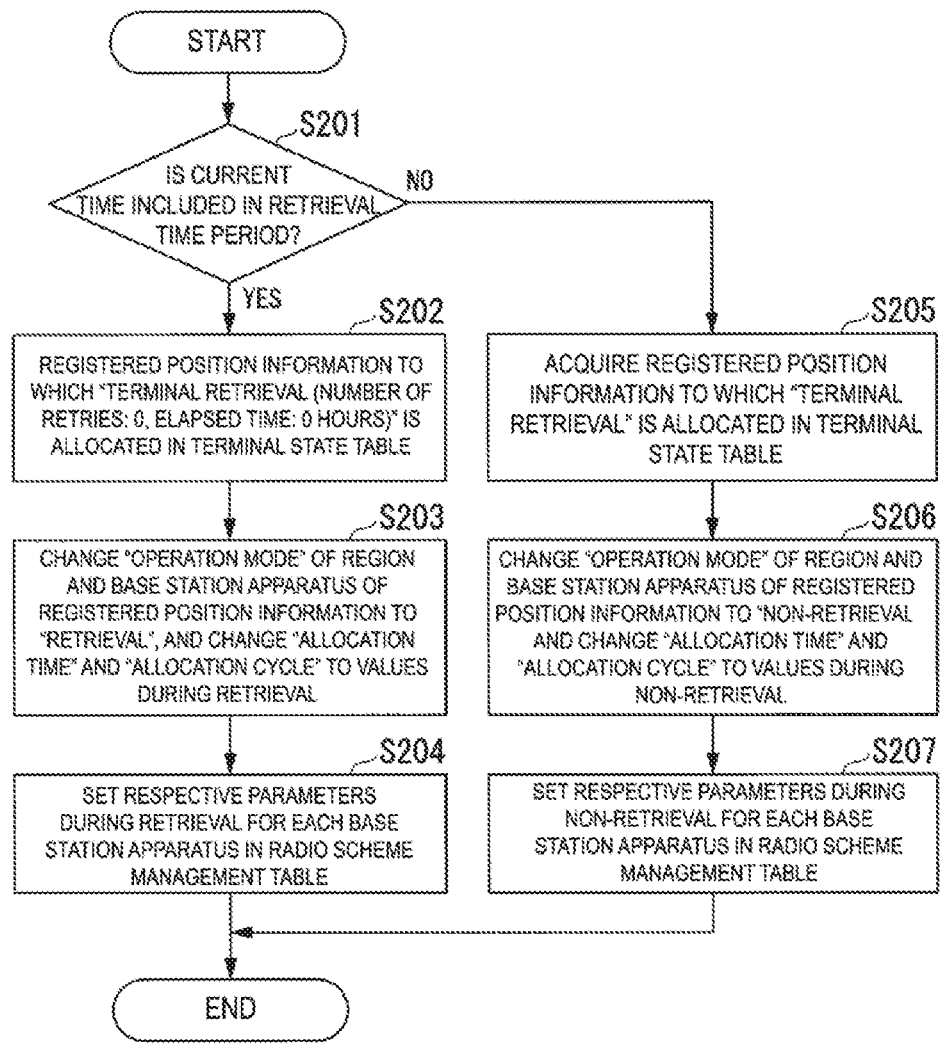
FIG. 11 is a flowchart illustrating an example of an operation in which the control apparatus changes an operation mode of the base station apparatus.

FIG. 11 is a flowchart illustrating an example of an operation in which the control apparatus 5 changes an operation mode of the base station apparatus 3. The control unit 53 determines whether the current time is included in the retrieval time period registered in the parameter table of the control apparatus 5 (step S201).

In a case where the current time is included in the retrieval time period (step S201: YES), the control unit 53 refers to the terminal state table, and acquires the registered position information "region 7-1: base station apparatus 3-1" associated with the state information "terminal retrieval (number of retries: 0, elapsed time: 0 hours)" (step S202).

With respect to an item associated with the region information "region 7-1" and the base station apparatus information "base station apparatus 3-1" in the radio scheme management table, the control unit 53 changes an operation mode from "non-retrieval" to "retrieval". The control unit 53 changes an allocation time to "1 second" that is the "allocation time of a synchronization signal in the retrieval mode" in the parameter table of the control apparatus 5. The control unit 53 changes an allocation cycle to "30 seconds" that is the "transmission cycle of a synchronization signal in the retrieval mode" in the parameter table of the control apparatus 5 (step S203).

The control unit 53 sets the operation mode "retrieval", the allocation time "1 second", and the allocation cycle "30 seconds" in the radio scheme management table as respective parameters during retrieval, for the base station apparatus 3-1. Consequently, the base station apparatus 3-1 can execute terminal retrieval on the basis of the set operation mode, allocation time, and allocation cycle (step S204).

In a case where the current time is not included in the retrieval time period (step S201: NO), the control unit 53 acquires registered position information associated with the state information "terminal retrieval" regardless of the number of retries and the elapsed time of the state information by referring to the terminal state table (step S205).

The control unit 53 retrieves region information and base station apparatus information of the acquired registered position information from the radio scheme management table. The control unit 53 changes an operation mode associated with the retrieved region information and base station apparatus information to "non-retrieval". The control unit 53 changes an allocation time associated with the retrieved region information and base station apparatus information to "10 seconds" that is the "allocation time of a radio signal in the non-retrieval mode" in the parameter table of the control apparatus 5. The control unit 53 changes an allocation cycle associated with the retrieved region information and base station apparatus information to "24 hours" that is the "allocation cycle of a radio signal in the non-retrieval mode" in the parameter table of the control apparatus 5 (step S206).

The control unit 53 sets the operation mode "non-retrieval", the allocation time "10 seconds", and the allocation cycle "24 hours" in the radio scheme management table as respective parameters during non-retrieval (during normal times), for each base station apparatus 3. Consequently, each base station apparatus 3 can execute a communication processing on the basis of the set operation mode, allocation time, and allocation cycle (step S207).

Figure 12:
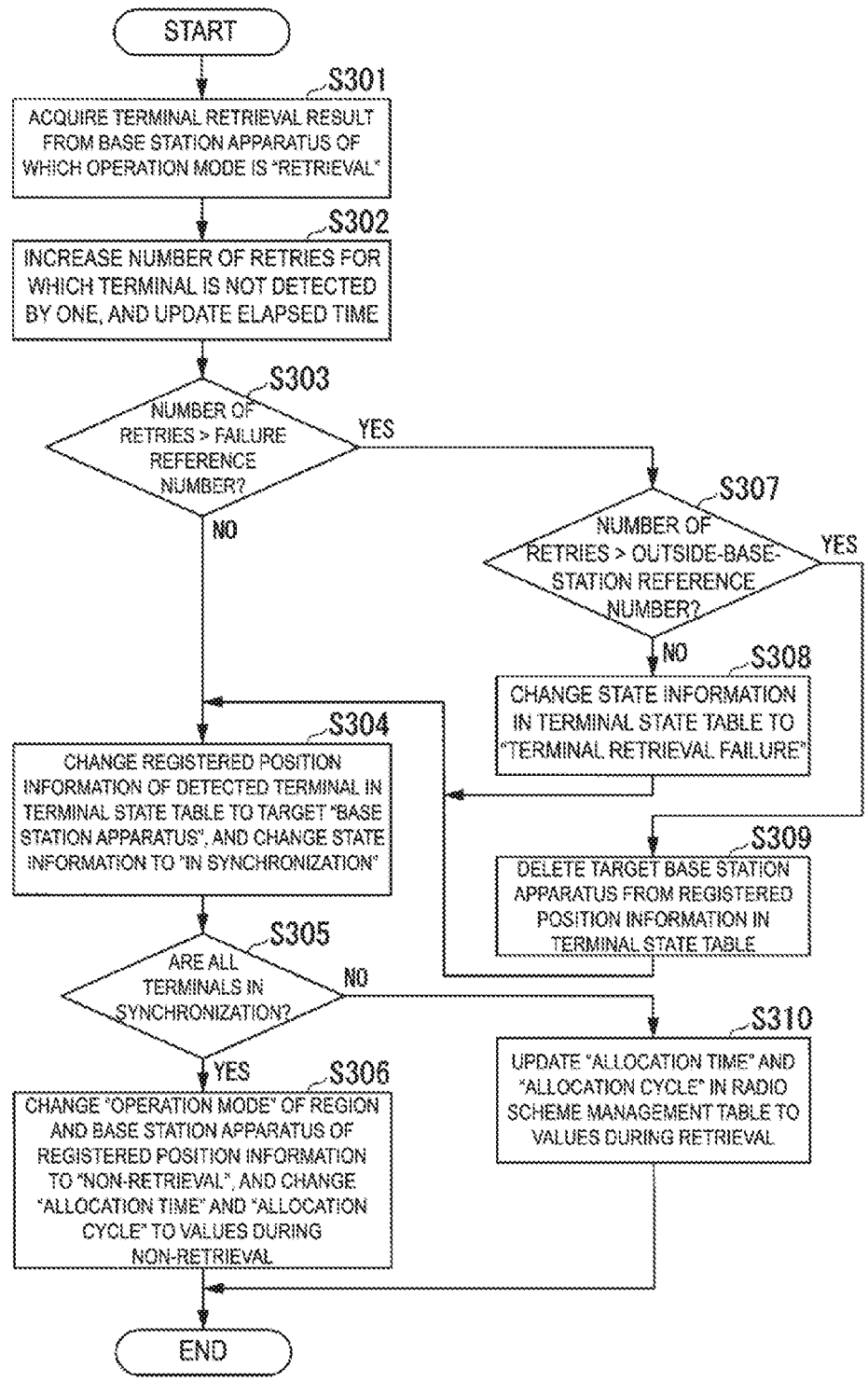
FIG. 12 is a flowchart illustrating an example of a synchronization signal transmission process.

FIG. 12 is a flowchart illustrating an example of a synchronization signal transmission process. The control unit 53 acquires "in synchronization", "terminal retrieval", or "terminal retrieval failure" as a terminal retrieval result from the base station apparatus 3 for which an operation mode is "retrieval". The control unit 53 registers the acquired terminal retrieval result in the state information of the terminal state table for each terminal 2 (step S301).

The control unit 53 increases, by one, the number of retries of the state information for the terminal 2 that is not detected among the terminals 2 associated with the base station apparatus 3 having executed terminal retrieval or the registered position information of the region 7 in the terminal state table. The control unit 53 updates the elapsed time of the state information of the terminal 2 for which the number of retries is increased by one in the terminal state table (step S302).

The control unit 53 determines whether the number of retries exceeds a reference number (hereinafter, referred to as a "failure reference number"), for determining failure of retrieval of a terminal position for the terminal 2, for which the number of retries is increased by one (step S303).

In a case where the number of retries is equal to or smaller than the failure reference number (step S303: NO), the control unit 53 changes the state information of the terminal 2 that is detected among the terminals 2 associated with the base station apparatus 3 having executed terminal retrieval or the registered position information of the region 7, to "in synchronization" in the terminal state table. The control unit 53 registers the base station apparatus 3, having detected the terminal 2 and the region 7 in which the base station apparatus 3 is located, on the registered position information of the terminal 2 for which the state information is changed to "in synchronization" (step S304).

The control unit 53 determines whether state information of all terminals 2 for which positions are registered in the region 7 is "in synchronization" for each region 7 of the registered position information associated with the first radio scheme in the terminal state table. For example, in FIG. 6, the control unit 53 determines whether state information of all of the terminals 2 such as the terminals 2-1 to 2-3 for which positions are registered in the region 7-1 of the registered position information is "in synchronization", or state information of at least one terminal 2 is not "in synchronization" (step S305).

In a case where the state information of all terminals 2 for which positions are registered in the region 7 is "in synchronization" (step S305: YES), the control unit 53 changes an operation mode associated with the base station apparatus 3 located in the region 7 in which the state information of all of the terminals 2 is "in synchronization", to "non-retrieval". The control unit 53 changes an allocation time associated with the base station apparatus 3 located in the region 7 to "10 seconds" that is the "allocation time of a radio signal in the non-retrieval mode" in the parameter table of the control apparatus 5. The control unit 53 changes an allocation cycle associated with the base station apparatus 3 located in the region 7 to "24 hours" that is the "allocation cycle of a radio signal in the non-retrieval mode" in the parameter table of the control apparatus 5. Consequently, the base station apparatus 3 can execute a synchronization signal transmission processing during non-retrieval (during normal times) on the basis of the changed operation mode, allocation time, and allocation cycle (step S306).

As for a terminal 2 for which the number of retries exceeds the failure reference number, in a case where the number of retries exceeds the failure reference number in step S303 (step S303: YES), the control unit 53 determines whether the number of retries has exceeded a reference number for determining that a terminal is located outside a range of the base station apparatus 3 (hereinafter, referred to as an outside-base-station reference number). The outside-base-station reference number is larger than the failure reference number (step S307).

In a case where the number of retries is equal to or smaller than the outside-base-station reference number (step S307: NO), the control unit 53 updates the state information of the terminal 2, for which the number of retries is greater than the failure reference number but not greater than the outside-base-station reference number, to "terminal retrieval failure" in the terminal state table (step S308). The control unit 53 proceeds to processing of step S304.

In a case where the number of retries exceeds the outside-base-station reference number (step S307: YES), the control unit 53 deletes the base station apparatus information from the registered position information of the terminal 2 for which the number of retries exceeds the outside-base-station reference number in the terminal state table (step S309). The control unit 53 proceeds to processing of step S304.

In a case where the state information of any terminal 2 for which the position is registered in the region 7 is not "in synchronization" in step S305 (step S305: NO), the control unit 53 acquires the maximum value of the number of retries included in the state information for each region 7 among the terminals 2 for which the positions are registered in each region 7 in the terminal state table. The control unit 53 acquires the transmission cycle of a synchronization signal in the retrieval mode and the allocation time of a synchronization signal in the retrieval mode, in compliance with the first radio scheme, from the parameter table of the control apparatus 5.

The control unit 53 changes the "allocation cycle" and the "allocation time" in the radio scheme management table to values during retrieval on the basis of the maximum value of the number of retries, the transmission cycle "30 seconds" of a synchronization signal in the retrieval mode, and the allocation time "1 second" of a synchronization signal in the retrieval mode. Consequently, the base station apparatus 3 can execute a synchronization signal transmission processing during retrieval on the basis of the changed operation mode, allocation time, and allocation cycle.

For example, the control unit 53 changes the "allocation cycle" and the "allocation time" associated with the operation mode "retrieval" in the radio scheme management table to values during retrieval on the basis of a function value of a function having, as inputs, the maximum value of the number of retries, the transmission cycle "30 seconds" of a synchronization signal in the retrieval mode, and the allocation time "1 second" of a synchronization signal in the retrieval mode.

For example, the control unit 53 may set a result obtained by dividing the transmission cycle "30 seconds" of a synchronization signal in the retrieval mode by the maximum value of the number of retries as the "allocation cycle" associated with the operation mode "retrieval" in the radio scheme management table. For example, the control unit 53 may set a result obtained by multiplying the transmission time "1 second" of a synchronization signal in the retrieval mode by the maximum value of the number of retries as the "allocation time" associated with the operation mode "retrieval" in the radio scheme management table (step S310).

As mentioned above, the radio communication system 1 of the embodiment includes the terminal 2 and the control apparatus 5. The terminal 2 includes the terminal synchronization unit 22 and the terminal control unit 23. The terminal synchronization unit 22 determines whether the base station apparatus 3 transmitting a control signal such as a synchronization signal and the terminal are synchronized in communication with each other. The base station apparatus 3 may transmit a beacon signal including a synchronization signal. In a case where synchronization in communication is determined as not occurring, the terminal control unit 23 refers to the parameter table of the terminal 2. In a case where synchronization in communication is determined as not occurring, the terminal control unit 23 determines whether the current time is included in the retrieval time period, and waits for a synchronization signal to be received in a case where the current time is included in the retrieval time period.

The control apparatus 5 includes the synchronization unit 51 and the control unit 53. The synchronization unit 51 determines whether there is the terminal 2 that is asynchronized in communication with the base station apparatus 3 in the region 7. In a case where it is determined that there is the asynchronized terminal 2, the control unit 53 controls the base station apparatus 3 to increase an allocation time of a synchronization signal in compliance with the first radio scheme used by the asynchronized terminal 2.

In a case where it is determined that there is the asynchronized terminal 2, the control unit 53 controls the base station apparatus 3 to shorten an allocation cycle of a synchronization signal in compliance with the first radio scheme used by the asynchronized terminal 2.

Consequently, the radio communication system 1 of the embodiment can suppress power consumption of the terminal 2 while improving a facility utilization factor of the base station apparatus 3.

The base station apparatus 3 can reduce an allocation time of the first radio scheme and a data amount of a synchronization signal in compliance with the first radio scheme, for retrieving a position of the asynchronized terminal 2. Consequently, the base station apparatus 3 can increase an allocation time of radio schemes other than the first radio scheme, and can thus improve a facility utilization factor of the base station apparatus 3. The terminal 2 can establish synchronization with the base station apparatus 3 for a short waiting time, and thus it is possible to suppress power consumption of the terminal 2.

As described above, the embodiment of the invention has been described in detail with reference to the drawings, but a specific configuration is not limited to the embodiment, and includes design within the scope without departing from the spirit of the invention.

REFERENCE SIGNS LIST

1 Radio communication system
2 Terminal
3 Base station apparatus
4 Communication line
5 Control apparatus
6 Radio processing apparatus
7 Region
20 Bus
21 Terminal storage unit
22 Terminal synchronization unit
23 Terminal control unit
24 Terminal signal processing unit
25 Terminal communication unit
30 Bus
31 Base station storage unit
32 Base station control unit
33 Base station signal processing unit
34 Base station communication unit
50 Bus
51 Synchronization unit
52 Storage unit
53 Control unit
54 Communication unit
60 Bus
61 Apparatus storage unit
62 Apparatus control unit
63 Apparatus signal processing unit
64 Apparatus communication unit

The invention claimed is:

1. A radio communication system comprising:
a terminal;
a base station apparatus; and
a control apparatus,
wherein the base station apparatus includes
a base station control unit configured to determine whether the base station apparatus and the terminal are synchronized in communication with each other and, in response to a determination that the base station apparatus and the terminal are not synchronized with each other, to notify the control apparatus of the same,
wherein the control apparatus includes
a synchronization unit configured to determine whether the base station apparatus and the terminal are synchronized in communication with each other and, in response to a determination that the base station apparatus and the terminal are not synchronized with each other, control the base station apparatus to increase an allocation time of the synchronization signal in compliance with a radio scheme used by the terminal,
wherein the terminal includes
a terminal synchronization unit configured to determine whether an elapsed time falls within a predetermined time period and wait for the synchronization signal to be received as long as the elapsed time is less than the predetermined time period, where the predetermined time period is set to the allocation time by the base station apparatus.

2. The radio communication system according to claim 1, wherein the control unit increases the allocation time of the synchronization signal or shortens the allocation cycle of the synchronization signal according to increases in the number of retries of terminal retrieval for determining whether there is the asynchronized terminal and an elapsed time from determination of asynchronization.

3. The radio communication system according to claim 2, wherein the control unit changes the number of base station apparatuses retrieving a position of the asynchronized terminal.

* * * * *